March 12, 1940.  A. J. MEYER  2,192,926
PISTON RING RETAINER
Filed April 21, 1938  2 Sheets-Sheet 1

INVENTOR.
Andre J. Meyer
BY
ATTORNEY.

March 12, 1940.  A. J. MEYER  2,192,926
PISTON RING RETAINER
Filed April 21, 1938  2 Sheets-Sheet 2
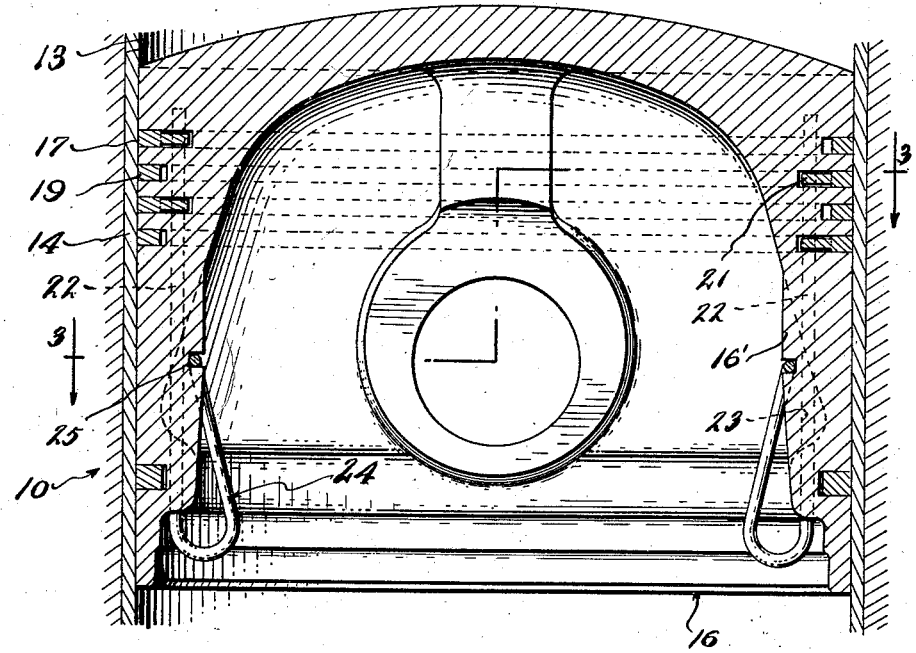
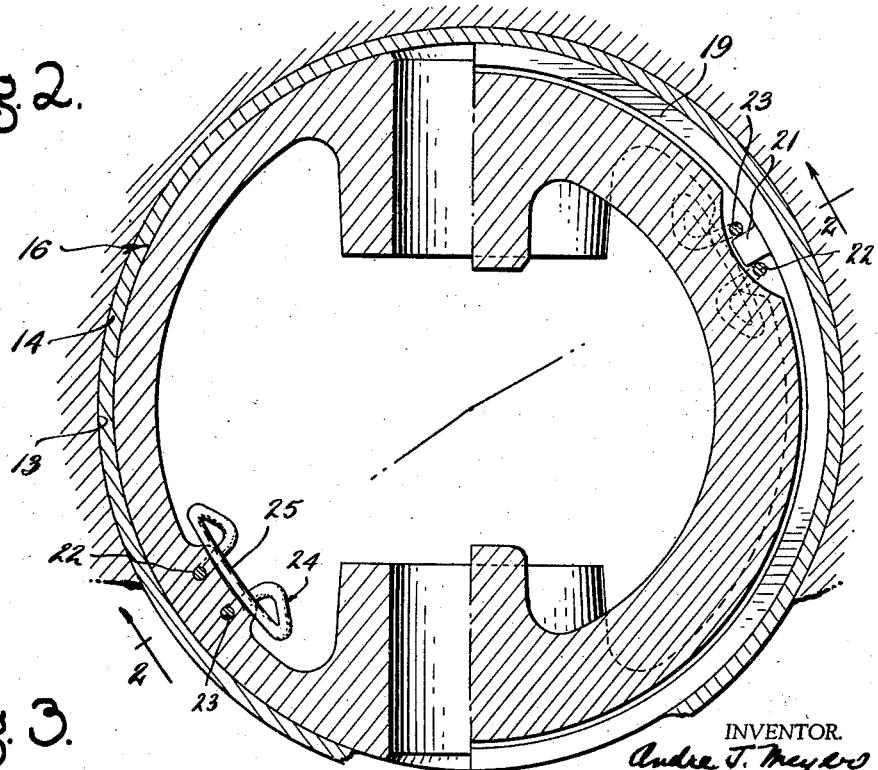
Fig. 2.
Fig. 3.
INVENTOR.
Andre J. Meyer
BY G. F. Hauke
ATTORNEY.

Patented Mar. 12, 1940

2,192,926

UNITED STATES PATENT OFFICE 2,192,926

PISTON RING RETAINER

Andre J. Meyer, Lexington, Ky., assignor, by mesne assignments, to Reconstruction Finance Corporation, Detroit, Mich., a corporation of the United States Application April 21, 1938, Serial No. 203,453

10 Claims. (Cl. 309—29)

This invention relates to engines and more particularly to the piston and split ring structure. It is often found desirable to positively locate and fix the piston rings against relatively angular shifting in the piston grooves, such a construction being particularly desirable in sleeve valve engines because of the sleeve ports, it being necessary to so locate the rings that the split in said rings will never move across the sleeve ports and not become lined up with each other.

In sleeve valve engines and particularly in a single sleeve valve engine where the sleeve valve is of the combined oscillating and reciprocating type, more difficulty has been experienced in locking the piston rings in a desired location because ordinary locking devices become sheared off or mutilated to such an extent as to be unfit for further use, due to the forces generated by the sleeve oscillation.

An object of the present invention is to provide a rugged piston ring locking device overcoming the many difficulties experienced with prior constructions, but which can be readily and economically assembled to the piston.

Another object is to minimize and facilitate service and maintenance of internal combustion engines and particularly engines of the sleeve valve type having sleeves given an oscillatory motion, by providing a yielding piston ring locking device which may be quickly assembled and locked in place but which is of such rugged construction as to minimize breakdowns because of ring failures.

Figure 1:
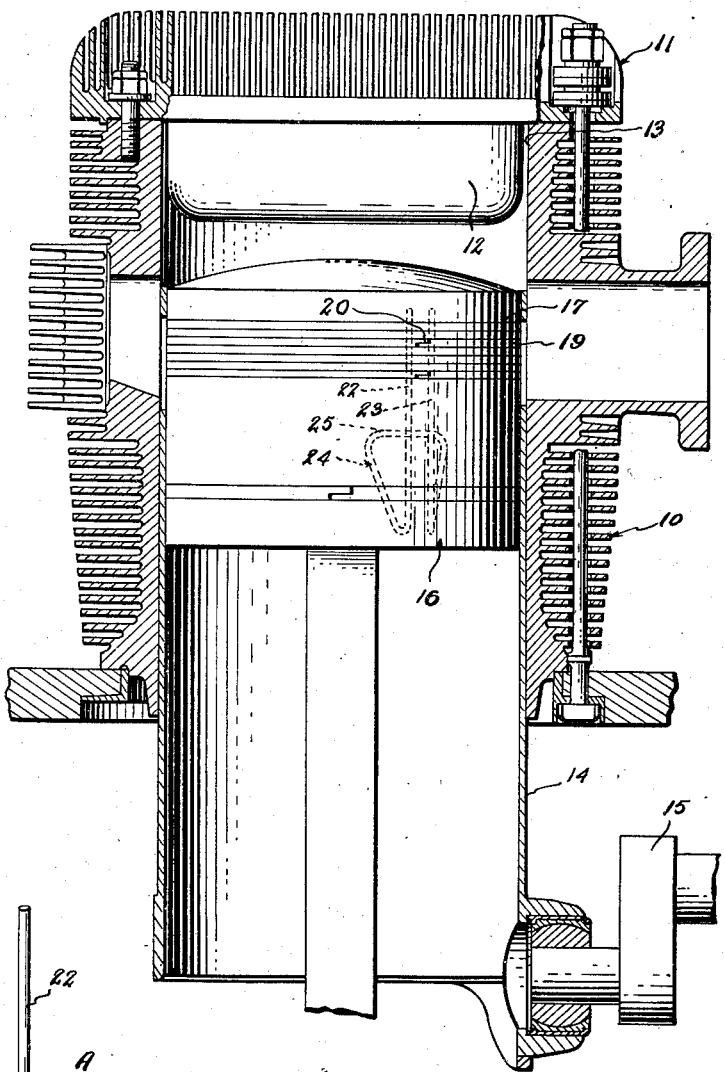
Figure 4:
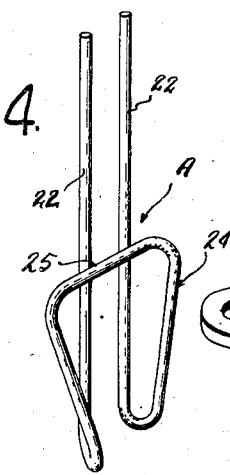
Figure 5:
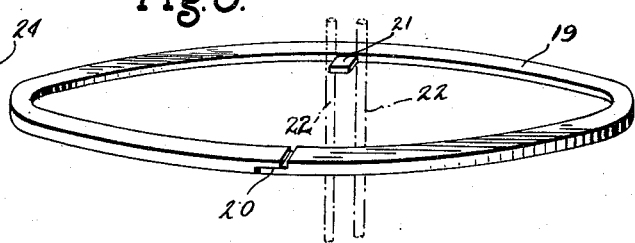

For a more detailed description of the present invention reference may be had to the accompanying drawings in which like characters refer to like parts throughout the several views, and in which:

Fig. 1 is a vertical sectional view through an engine cylinder illustrating the invention in connection with a single sleeve valve engine, Fig. 2 is an enlarged vertical sectional view through a piston illustrating in detail the construction of the piston ring locking device, and taken substantially on the line 2—2 of Fig. 3, Fig. 3 is a horizontal sectional view through the piston taken substantially on the line 3—3 of Fig. 2, Fig. 4 is a detail perspective view of the ring locking device, and Fig. 5 is a detail perspective view of the piston ring.

As a matter of convenience, the present invention is illustrated in connection with a single sleeve valve engine, although it will be obviously understood that the principles of the invention can be incorporated in engines of other types. The engine comprises a finned cylinder 10 to which is secured the conventional cylinder head structure 11 provided with a re-entrant head portion 12 spaced from the cylinder walls to provide a sleeve pocket 13. The cylinder is ported for intake and exhaust and a sleeve valve 14 operable in said cylinder is likewise ported for intake and exhaust and is driven in a conventional manner by a sleeve driving crank 15 driven by the engine crankshaft through any suitable mechanism (not shown).

A piston 16 operating in said cylinder and preferably in contact with the inside surface of the sleeve valve 14 is provided with a plurality of ring grooves 17 which are each provided with a recess 18. Said ring grooves are arranged to accommodate the piston rings 19, each of which are split as at 20 and provided with an inwardly extending lug 21. The recesses 18 are preferably arranged in a manner, so as to locate the recess in one groove substantially diametrically opposite to the recesses in the adjacent grooves, for example, numbering the grooves from top to bottom 1, 2, 3, 4, etc. the recess in groove 2 is located diametrically opposite to the recesses in grooves 1 and 3, and likewise the recess in groove 3 is located diametrically opposite to the recesses in grooves 2 and 4. Preferably the recesses in the odd numbered grooves are aligned axially of the piston and the recesses in the even numbered grooves are aligned axially of the piston and substantially located or positioned diametrically opposite to each other. (See Figs. 2 and 3.)

The rings are locked in position by means of a hair pin type spring locking device A, which device comprises a pair of substantially parallel prongs 22, which prongs are thrust through parallel holes 23 extending axially into the piston skirt 16', said holes 23 opening into the recesses 18. Therefore the prongs 22 extend across the recesses 18 and straddle the lug 21 carried by the piston ring as clearly shown in Fig. 3. These prongs prevent the rings engaged thereby from turning and also since they engage substantially the mid point of the ring, the wrapping effect is substantially minimized. The ring lug is thus caused to engage the prongs and is prevented from contact with the sloping side walls of the recess. The prongs are of rugged spring steel stock capable of resisting forces tending to shear them off.

The lower portion of the locking device is constructed to provide a return bent portion 24 and includes a straddle portion 25 arranged to be yieldingly or spring pressed into the slot 26 carried by the piston to lock the device from being accidentally slipping out of the holes 23.

In operation the rings are preferably first assembled to the piston and the hairpin locking devices are pushed into place until the straddle portion 25 springs into the slot 26. It will be noted that as many locking devices as may be desired can be used, but a pair is sufficient for satisfactory service. In the present construction one of such devices A engages the rings in the odd numbered grooves while the other of such devices engages the rings in the even numbered grooves, but obviously this general arrangement may be varied if so desired.

It will be apparent that modifications and variations in structure may be incorporated without departing from the spirit of the invention or from the scope of the appended claims.

What I claim as my invention is:

1. In a device of the character described, a piston having a plurality of piston ring grooves, split rings seating in said grooves, and a spring clip snapped into a yielding locking engagement with said piston and having a prong extending axially through said piston wall and engaging one or more of said rings to lock same from rotation in said groove.

2. In a device of the character described, a piston including a skirt portion and having a plurality of piston ring grooves, split rings seating in said grooves, each of said rings having an inwardly extending lug substantially opposite to the split, said piston having openings extending longitudinally through the skirt portion and opening into said piston ring grooves, and a prong extending through said opening for engagement with the lug carried by each of said rings to lock same from rotation in said groove.

3. In a device of the character described, a piston including a skirt portion and having a plurality of piston ring grooves, split rings seating in said grooves, each of said rings having an inwardly extending lug substantially opposite to the split, said piston having openings extending longitudinally through the skirt portion and opening into said piston ring grooves, and a hairpin type clip having a pair of prongs extending through said openings and arranged to straddle the lug carried by said ring to lock same from rotation in said groove.

4. In a device of the character described, a piston having a plurality of piston ring grooves, split rings seating in said grooves and each having an inwardly extending lug, a pair of said grooves having axially aligned inwardly extending recesses for accommodating said ring lugs, said piston having a skirt portion provided with spaced holes drilled longitudinally through the skirt portion and opening into the recesses, a two pronged hair pin type clip extending through said holes for engagement with said ring lugs to lock the ring against rotation in said groove, and means for locking said clip to said piston.

5. In a device of the character described, a piston having a plurality of piston ring grooves, split rings seating in said grooves and each having an inwardly extending lug located substantially diametrically opposite the split, every alternate one of said piston grooves having axially aligned inwardly extending recesses for accommodating said ring lugs, and a single fastening device carried by said piston for engaging a plurality of said aligned ring lugs to lock the rings against rotation in said grooves.

6. In a device of the character described, a piston having a plurality of piston ring groves, split rings seating in said grooves and each having an inwardly extending lug located substantially diametrically opposite the split, said piston grooves having axially aligned inwardly extending recesses for accommodating said ring lugs, said piston including a skirt portion having a pair of holes extending longitudinally therethrough and opening into said recesses, and a fastening device detachably secured to said piston and having a pair of prongs extending through said holes into engagement with said ring lugs to lock the rings against rotation in said grooves.

7. In a device of the character described, a piston having a plurality of piston ring grooves, split rings seating in said grooves and each having an inwardly extending lug located substantially diametrically opposite the split, said piston grooves having axially aligned inwardly extending recesses for accommodating said ring lugs, said piston including a skirt portion having a pair of holes extending longitudinally therethrough and opening into said recesses, and a return bent hair pin type ring locking device having a pair of prongs extending through said holes into engagement with said ring lugs whereby to lock the rings against rotation in said grooves, said return bent portion of said ring locking device including a yielding spring portion yieldingly locked to said piston.

8. In a device of the character described, a piston having a plurality of piston ring grooves, split rings seating in said grooves and each having an inwardly extending lug located substantially diametrically opposite the split, said piston grooves having axially aligned inwardly extending recesses for accommodating said ring lugs, said piston including a skirt portion having a pair of holes extending longitudinally therethrough and opening into said recesses, and a return bent hair pin type ring locking device having a pair of prongs extending through said holes into engagement with said ring lugs whereby to lock the rings against rotation in said grooves, the inner face of said piston skirt provided with a slots, said locking device including a yielding spring portion yieldingly engaging in said slot to yieldingly lock said locking device to said piston.

9. In a device of the character described, a piston having a plurality of piston ring grooves consecutively numbered 1, 2, 3, 4, etc., from top to bottom, split rings seating in said grooves and each having an inwardly extending locating lug respectively located in each instance a predetermined degree from the splits in said rings, said piston grooves each having inwardly extending recesses for accommodating said ring lugs, the recesses associated with the odd numbered grooves being aligned axially of the piston and the recesses associated with the even numbered grooves being respectively aligned axially of the piston and angularly spaced with respect to the recesses associated with the odd numbered grooves, a single fastening device carried by said piston for engaging said ring lugs in the recesses of said odd numbered grooves, and another fastening device carried by said piston for engaging said ring lugs in the recesses of said even numbered grooves.

10. In a device of the character described, a piston having a plurality of piston ring grooves, split rings seating in said grooves and each having an inwardly extending locating lug, said piston ring grooves each provided with a recess for accommodating a ring lug, said recesses being arranged whereby to align ring lugs of every other ring, and a pronged locking device carried by the piston for engaging aligned ring lugs whereby to lock said rings against rotation in said grooves.

ANDRE J. MEYER.